US010158302B2

(12) United States Patent
Fukano et al.

(10) Patent No.: US 10,158,302 B2
(45) Date of Patent: Dec. 18, 2018

(54) ELECTRIC POWER EQUIPMENT

(71) Applicant: HONDA MOTOR CO., LTD., Tokyo (JP)

(72) Inventors: Jun Fukano, Wako (JP); Masato Takeda, Wako (JP); Keisuke Muraoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/819,695

(22) Filed: Nov. 21, 2017

(65) Prior Publication Data

US 2018/0152121 A1 May 31, 2018

(30) Foreign Application Priority Data

Nov. 28, 2016 (JP) .................. 2016-230624

(51) Int. Cl.
| | |
|---|---|
| *H02P 1/00* | (2006.01) |
| *H02P 3/00* | (2006.01) |
| *H02P 5/00* | (2016.01) |
| *H02P 7/00* | (2016.01) |
| *A01D 34/00* | (2006.01) |
| *A01D 34/69* | (2006.01) |
| *A01D 34/78* | (2006.01) |
| *B60L 11/18* | (2006.01) |
| *H02J 7/00* | (2006.01) |
| *A01D 101/00* | (2006.01) |
| *A01D 69/02* | (2006.01) |

(52) U.S. Cl.
CPC .............. *H02P 5/00* (2013.01); *A01D 34/006* (2013.01); *A01D 34/69* (2013.01); *A01D 34/78* (2013.01); *B60L 11/1861* (2013.01); *B60L 11/1864* (2013.01); *H02J 7/0063* (2013.01); *A01D 69/02* (2013.01); *A01D 2101/00* (2013.01); *B60L 2200/40* (2013.01); *B60L 2240/421* (2013.01)

(58) Field of Classification Search
CPC .......... H02P 5/00; A01D 34/006; A01D 34/69
USPC ....................................................... 318/139
See application file for complete search history.

(56) References Cited

U.S. PATENT DOCUMENTS

| | | | |
|---|---|---|---|
| 3,809,975 A * | 5/1974 | Bartels ...................... | H02P 7/29 318/139 |
| 5,906,088 A | 5/1999 | Inui et al. | |
| 5,937,622 A * | 8/1999 | Carrier ................. | A01D 34/006 56/11.9 |
| 9,263,975 B2 * | 2/2016 | Wang ..................... | A01D 34/78 |

(Continued)

FOREIGN PATENT DOCUMENTS

| | | |
|---|---|---|
| EP | 2420130 A1 | 2/2012 |
| JP | H09201126 A | 8/1997 |

OTHER PUBLICATIONS

Extended European Search Report, EP Application No. 17203830.9, dated Mar. 26, 2018, 7 pages.

*Primary Examiner* — Erick Glass
(74) *Attorney, Agent, or Firm* — Armstrong Teasdale LLP

(57) ABSTRACT

Electric power equipment such as a lawn mower is provided with a travel unit driven by a travel motor for propelling the equipment, a work unit driven by a work motor to perform prescribed work such as cutting grass as the equipment travels, a battery for powering the motors, and a control unit which is configured to lower a rotational speed of the travel motor according to a decrease in the voltage or the remaining charge of the battery.

6 Claims, 5 Drawing Sheets

(56) References Cited

U.S. PATENT DOCUMENTS

| | | | |
|---|---|---|---|
| 2005/0057226 A1* | 3/2005 | Kawakami | B60L 11/06 322/24 |
| 2009/0069964 A1* | 3/2009 | Wyatt | B60L 3/00 701/22 |
| 2013/0104509 A1 | 5/2013 | Mackinnon et al. | |
| 2013/0211646 A1* | 8/2013 | Yamamura | G05D 1/0225 701/22 |
| 2014/0062352 A1* | 3/2014 | Wang | A01D 34/78 318/139 |
| 2016/0183451 A1* | 6/2016 | Conrad | A01D 34/006 56/10.2 R |

* cited by examiner

ELECTRIC POWER EQUIPMENT

TECHNICAL FIELD

The present invention relates to electric power equipment provided with a work unit for performing a prescribed work and a travel unit for enabling the electric power equipment to travel on a ground surface. The electric power equipment may include, not exclusively, lawn mowers, grass trimmer, snow blowers and tillers.

BACKGROUND ART

Lawn mowers powered by an electric motor are known. An electric motor generates less noise and emits no exhaust gas, as opposed to an internal combustion. In particular, electric lawn mowers carrying a battery for driving a cutting blade via an electric motor are gaining popularity. See JPH09-201126A, for instance. Because of the absence of a power cable, the lawn mower powered by a battery can freely travel over a wide area in a comfortable manner.

However, because an electric lawn mower powered by a battery can be operated only for a time duration permitted by the limited capacity of the battery, the amount of work that can be performed, and the time duration of work are limited. Therefore, in designing a lawn mower carrying a battery, it is important to efficiently utilize the energy available from the given battery.

SUMMARY OF THE INVENTION

In view of such a problem of the prior art, a primary object of the present invention is to provide electric power equipment powered by a battery which is able to efficiently utilize the available energy.

The present invention achieves such an object by providing electric power equipment (1), comprising: a work unit (3) for performing prescribed work; a work motor (8) for driving the work unit; a travel unit (5) for enabling the electric power equipment to travel on a ground surface; a travel motor (9) for driving the travel unit; a battery (20) for supplying electric power to the work motor and the travel motor; a control unit (10) for controlling electric power supplied to the work motor and the travel motor; and a battery condition detecting unit (38; 39) for detecting a voltage or a remaining charge of the battery; wherein the control unit is configured to lower a rotational speed of the travel motor according to a decrease in the voltage or the remaining charge of the battery.

By thus reducing the travel speed of the electric power equipment when the battery is low, the load of the work motor can be reduced owing to the reduction in the amount of work (such as the amount of grass to be cut and the amount of snow to be removed) that is to be performed per unit time. Thereby, the electric power required to drive the work motor can be reduced so that the battery is able to continue to drive the work motor even though the battery is low. Therefore, the amount of work that can be performed and/or the time duration of work can be increased. Even when the battery is low, if the electric power supplied to the work motor is reduced, the battery is able to drive the work motor for a longer period of time, and a greater amount of work can be performed for the given low state of the battery.

According to a preferred embodiment of the present invention, the electric power equipment further comprises an operation input unit (14) for accepting a commanded rotational speed of the travel motor from a user, and the control unit is configured to set a target speed of the travel motor to the commanded rotational speed when the voltage or the remaining charge of the battery is above a prescribed level, and set the target speed to a value lower than the commanded rotational speed when the voltage or the remaining charge of the battery is below the prescribed level.

The operation input unit allows the travel speed of the electric power equipment to be varied as desired by the operator. In this case also, the travel speed of the electric power equipment is reduced from the commanded travel speed selected via the operation input unit. Thereby, the amount of work that can be performed and/or the time duration of work can be increased.

According to a certain aspect of the present invention, the electric power equipment further comprises a work motor load detection unit (41) for detecting a load acting on the work motor, and the control unit is configured to lower the rotational speed of the travel motor when the voltage or the remaining charge of the battery is below a prescribed level, and the load acting on the work motor is greater than a prescribed load determination value.

When the load acting on the work motor is light, a reduction in the travel speed of the electric power equipment results in very little reduction in the load acting on the work motor. Therefore, in such a case, the travel speed may be maintained at the current level, so that the work that is being performed may be continued without any slow down, and may possibly be finished in as short a time as possible.

According to another aspect of the present invention, the electric power equipment further comprises an operation input unit (14) for accepting a commanded rotational speed of the travel motor from a user, and the control unit is configured to lower the rotational speed of the travel motor when the voltage or the remaining charge of the battery is below a prescribed level, and the commanded rotational speed is higher than a prescribed rotational speed determination value.

When the travel speed of the electric power equipment is low, a reduction in the travel speed of the electric power equipment results in very little reduction in the load acting on the work motor. Therefore, in such a case, the travel speed may be maintained at the current level, so that the work that is being performed may be continued without any slow down, and may possibly be finished in as short a time as possible.

According to yet another aspect of the present invention, the electric power equipment further comprises an operation input unit (14) for accepting a commanded rotational speed of the travel motor from a user, and a work motor load detection unit (41) for detecting a load acting on the work motor, wherein the control unit is configured to lower the rotational speed of the travel motor when the voltage or the remaining charge of the battery is below a prescribed level, the load acting on the work motor is greater than a prescribed load determination value, and the commanded rotational speed is higher than a prescribed rotational speed determination value.

When the load acting on the work motor is light and the travel speed of the electric power equipment is low, a reduction in the travel speed of the electric power equipment results in very little reduction in the load acting on the work motor. Therefore, in such a case, the travel speed may be maintained at the current level so that the work that is being performed may be continued without any slow down, and may possibly be finished in as short a time as possible.

The control unit may be configured to limit the rotational speed of the travel motor to a level equal to or lower than a prescribed rotational speed upper limit value when the voltage or the remaining charge of the battery is below a prescribed level.

Thereby, the load on the work motor can be reduced in a reliable manner depending on the voltage or the remaining charge of the battery by using a highly simple structure.

The present invention thus provides electric power equipment powered by a battery which is able to efficiently utilize the available energy.

DETAILED DESCRIPTION OF THE PREFERRED EMBODIMENT(S)

A walk behind electric lawn mower according to an embodiment of the present invention is described in the following with reference to FIGS. 1 to 5.

Figure 1:
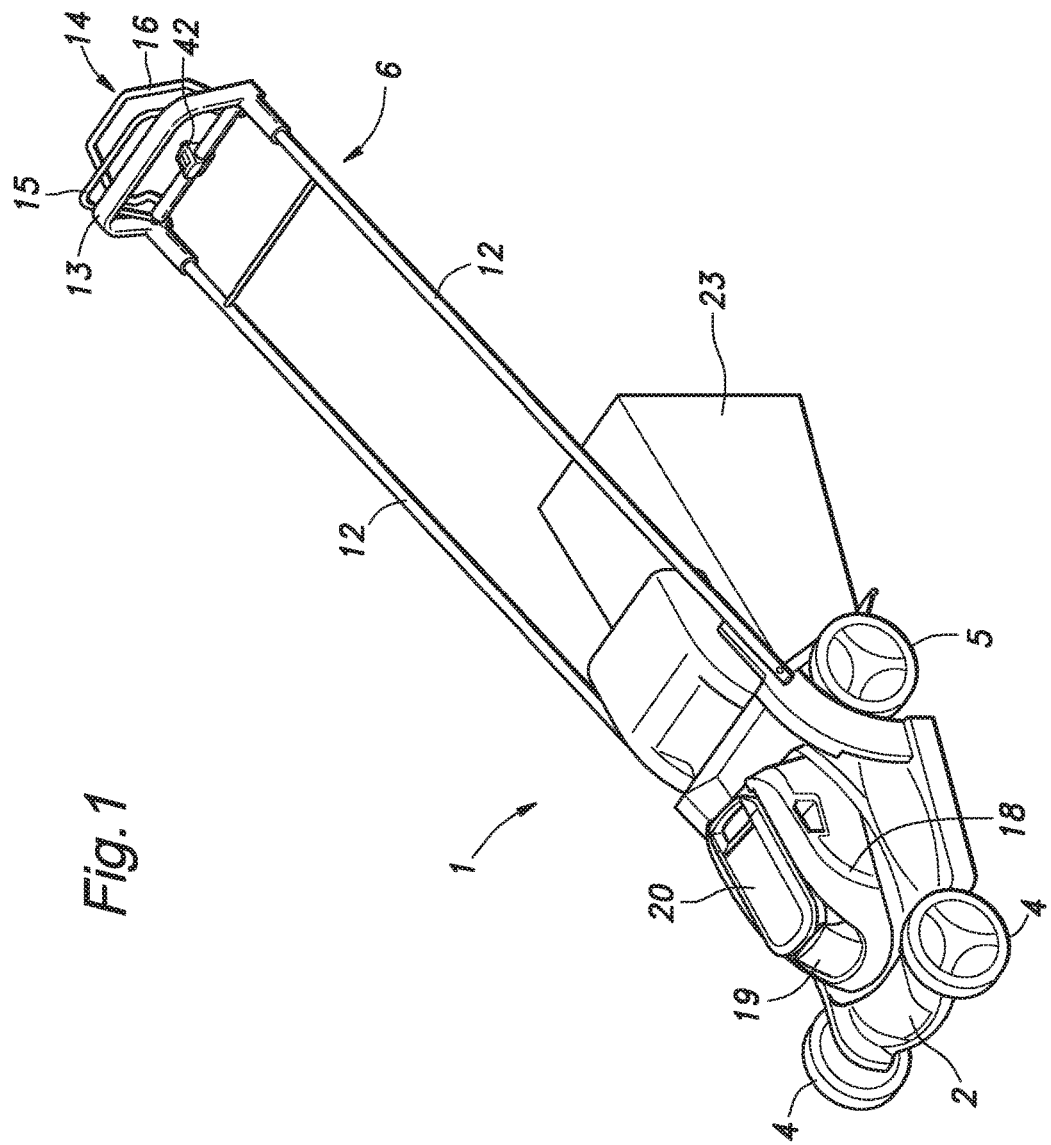
FIG. 1 is a perspective view of a walk behind electric lawn mower according to an embodiment of the present invention.
Figure 2:
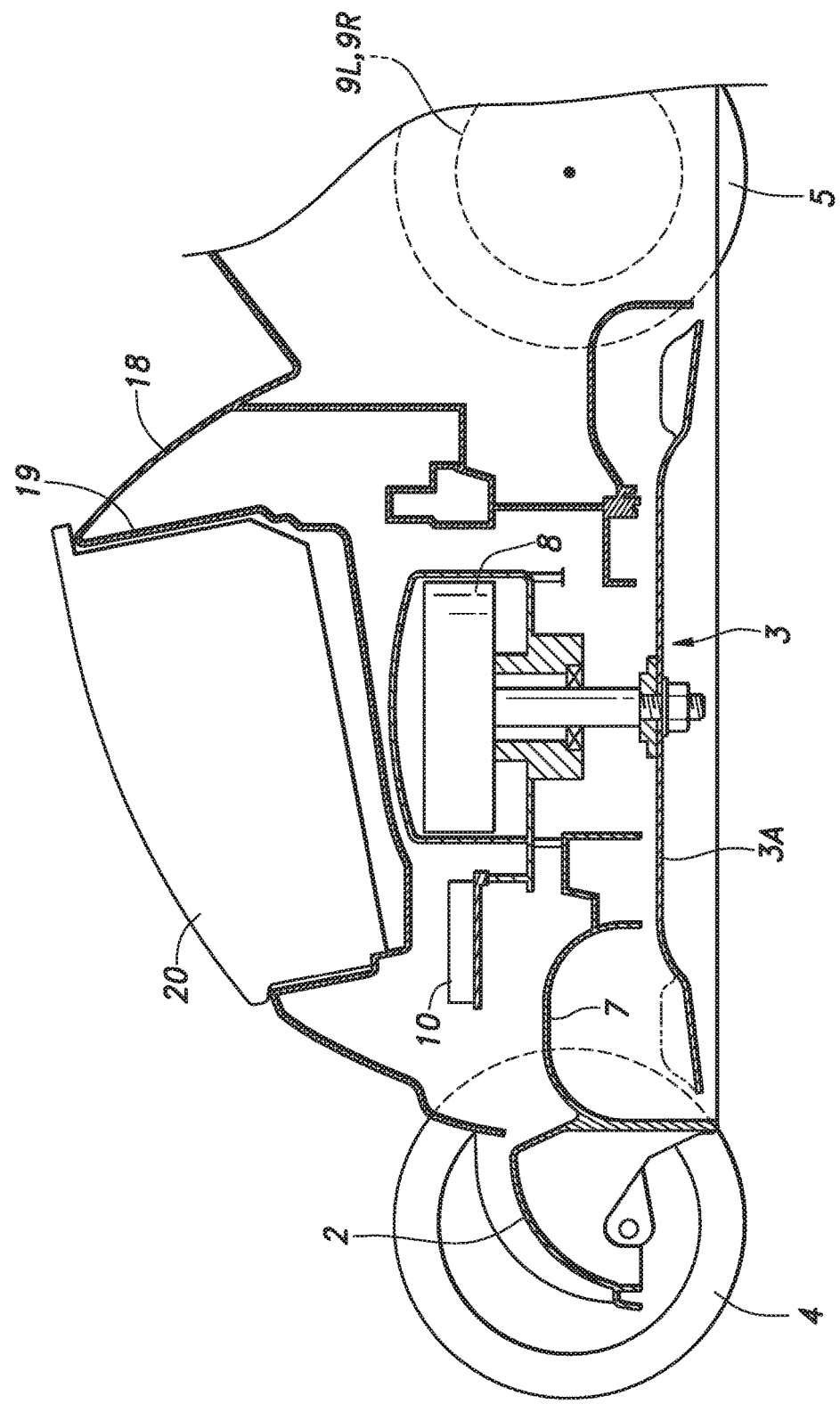
FIG. 2 is a sectional view of the electric lawn mower.

As shown in FIGS. 1 and 2, the electric lawn mower 1 according to the present embodiment includes a main body 2, a work unit 3 provided in a lower part of the main body 2, a pair of front wheels 4, a pair of rear wheels 5, and a handle 6 extending rearward and upward from the main body 2. The work unit 3 is provided with a recess 7 that opens out downward at the center of the lower part of the main body 2 and a blade 3A that is rotatably disposed in the recess 7. The main body 2 is provided with an electric motor 8 having an output shaft supporting the blade 3A, and a pair of electric motors 9L and 9R connected to the left and right rear wheels 5, respectively, for rotating the rear wheels 5. The electric motor 8 for driving the blade 3A is referred to as a work motor 8, and the electric motors 9L and 9R for driving the rear wheels 5 are referred to as travel motors 9 in the following disclosure. The main body 2 is further provided with a control unit 10 for controlling these electric motors 8, 9L and 9R.

The handle 6 includes a pair of side bars 12 extending upward and rearward from either side of the main body 2 and a cross bar grip 13 connected between the rear ends of the side bars 12. The cross bar grip 13 of the handle 6 is provided with an operation input unit 14 for receiving an input operation by an operator. The operation input unit 14 is provided with a travel lever 15 for operating the travel motors 9L and 9R and a work lever 16 for operating the work motor 8.

The upper end of the main body 2 is provided with an upper cover 18 that covers the work motor 8, the left and right travel motors 9L and 9R, and the control unit 10. A battery tray 19 is formed by recessing the upper surface of the upper cover 18 to detachably receive a battery 20 for supplying electric power to the motors 8 and 9 and the control unit 10.

The main body 2 internally defines a passage (not shown) extending from the recess 7 to the rear end of the main body 2, and a grass bag 23 is detachably fitted to an open rear end of the passage. The grass cut by the blade 3A is discharged from the recess 7 to the rear through the passage, and collected in the grass bag 23.

Figure 3:
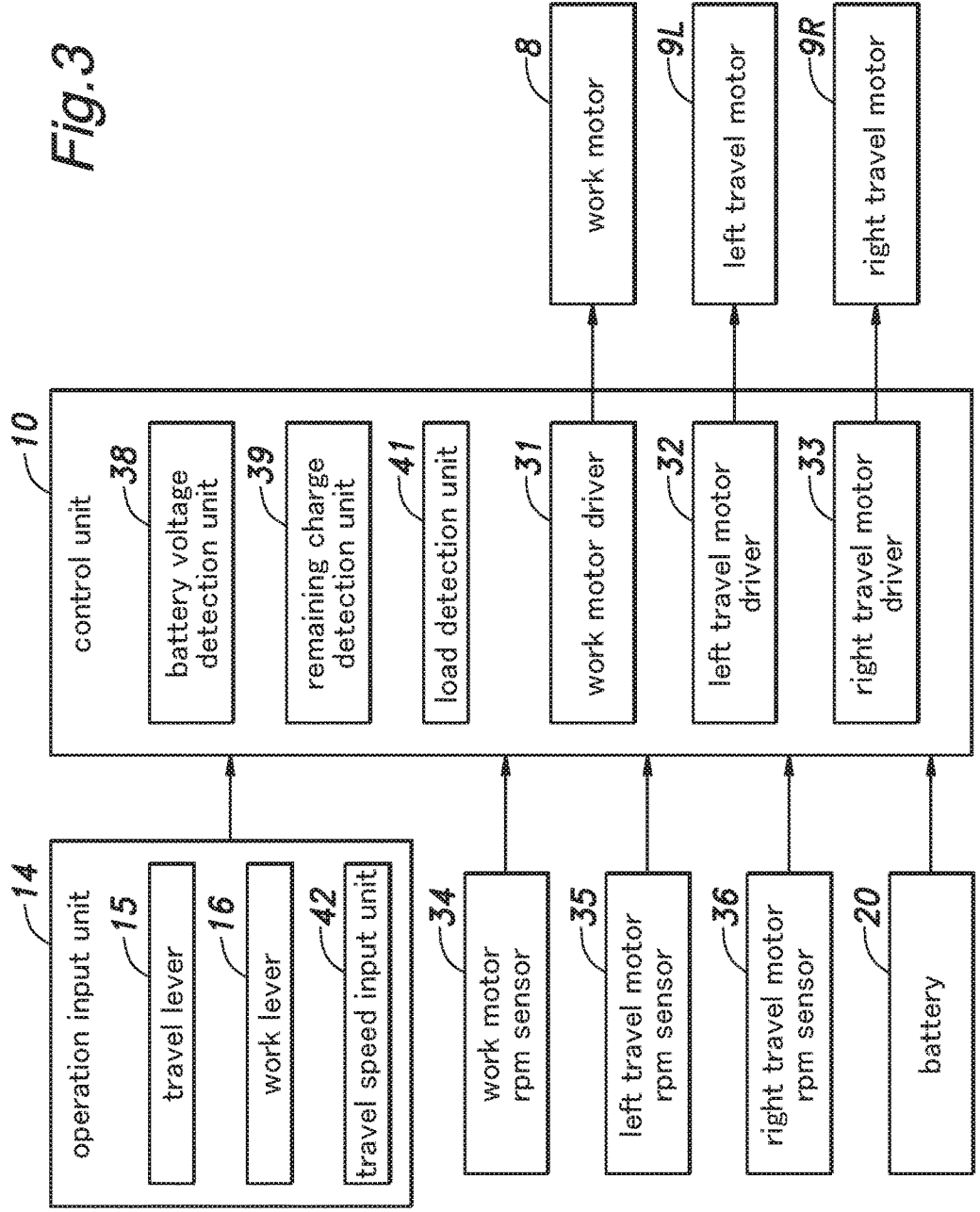
FIG. 3 is a block diagram of a control unit for the electric lawn mower.

The control unit 10 consists of an electronic control circuit (ECU) including a microcomputer, ROM, RAM, a peripheral circuit, an input/output interface, drivers and the like. As shown in FIG. 3, the control unit 10 is connected to the battery 20 and receives power supply from the battery 20. The control unit 10 is provided with motor drivers 31, 32 and 33 corresponding to the work motor 8 and the left and right travel motors 9L and 9R, respectively. The control unit 10 controls the operation of the motors 8, 9L and 9R by controlling the electric power supplied from the battery 20 to the motors 8, 9L and 9R via the motor drivers 31 to 33, for instance as a PWM control process.

The work motor 8 and the left and right travel motors 9L and 9R are provided with respective rotational angle sensors 34, 35 and 36 for detecting the rotational angles of the corresponding motors 8, 9L and 9R. The rotational angle sensors 34, 35 and 36 forward signals corresponding to the rotational angles of the respective motors 8, 9L and 9R to the control unit 10, and the control unit 10 determines the rotational speeds of the motors 8, 9L and 9R according to the signals from the corresponding rotational angle sensors 34, 35 and 36.

The control unit 10 is provided with a battery voltage detection unit 38 for detecting the voltage of the battery 20, and a battery remaining charge detection unit 39 for detecting a remaining charge of the battery 20. The battery remaining charge detection unit 39 may consist of any per se known device for determining the state of charge (SOC) of the battery 20, and may be based on, not exclusively, a voltage measuring method, a coulomb count method, a cell modeling method and an impedance track method. The control unit 10 may be provided with at least one of the battery voltage detection unit 38 and the battery remaining charge detection unit 39.

The control unit 10 is provided with a load detection unit 41 that detects a work motor load L [N·m] acting upon the work motor 8. The load detection unit 41 may detect the work motor load L based on the current (load current) flowing through the work motor 8, for instance. The load detection unit 41 may use the value of the current (load current value [A]) supplied to the work motor 8 as representing the work motor load L. In another embodiment, the magnetostrictive torque sensor is affixed to the output shaft of the work motor 8 which is fitted with the blade 3A so that the load detection unit 41 may detect the work motor load L from the output signal of the magnetostrictive torque sensor.

The travel lever 15 and the work lever 16 are each pivotally attached to the handle 6 so as to be moveable between an initial position where the lever 15, 16 is separated from the cross bar grip 13 of the handle 6, and an operation position where the lever 15, 16 is brought close to the cross bar grip 13 of the handle 6. The operation input unit 14 outputs a travel ON signal to the control unit 10 when the travel lever 15 is in the operation position, and outputs a blade ON signal to the control unit 10 when the work lever 16 is in the operation position.

The operation input unit 14 is provided with a travel speed input unit 42 for accepting an input operation by an operator regarding the travel speed of the electric lawn mower 1. The travel speed input unit 42 may consist of a lever, a dial, or the like that can be displaced with respect to the main body of the operation input unit 14, and the operation input unit 14 outputs a signal corresponding to the position of the travel speed input unit 42 to the control unit 10. Based on the signal from the operation input unit 14, the control unit 10 acquires a commanded rotational speed Vr [rpm] of the travel motors 9L and 9R corresponding to the travel speed desired by the operator.

Figure 4:
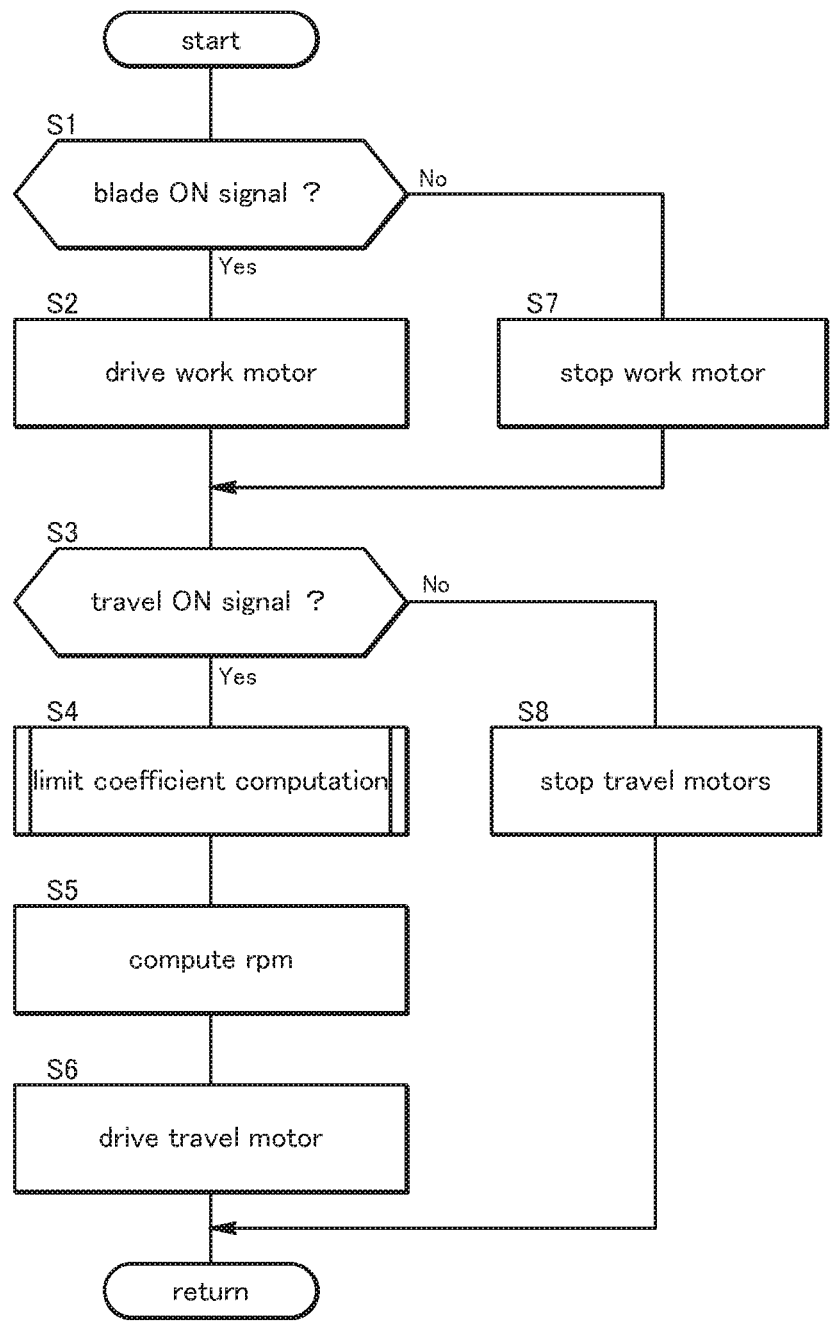
FIG. 4 is a flow chart showing a control process performed by the control unit.

The mode of operation of the control unit 10 is described in the following with reference to FIGS. 4 and 5. As shown in FIG. 4, the control unit 10 awaits for a blade ON signal in step S1, and when a blade ON signal is received, the control unit 10 controls the work motor driver 31 accordingly or starts driving the work motor 8 in step S2. At this time, the control unit 10 performs a feedback control such that the rotational speed of the work motor 8 is maintained at a predetermined rotational speed VB (corresponding to the commanded rotational speed Vr selected at the travel speed input unit 42) according to the signal from the work motor rotational angle sensor 34. When no blade ON signal is received, the control unit 10 stops the work motor 8 or keeps the work motor 8 stationary in step S7. In either case, the control flow proceeds to step S3.

In step S3 that follows step S2 or step S7, the control unit 10 awaits for a travel ON signal. When no travel ON signal is received in step S3, the control unit 10 proceeds to step S8 to stop the travel motors 9L and 9R or keep the travel motors 9L and 9R stationary. Upon receiving a travel ON signal in step S3, the control unit 10 computes a limit coefficient K for limiting the rotational speed of the travel motors 9L and 9R (or the travel speed of the electric lawn mower 1). The limit coefficient K is a value that may range between 0 and 1, and the computation of the limit coefficient K in step S4 is performed according to the control flow shown in FIG. 5 as will be described hereinafter.

In step S5 that follows step S4, the control unit 10 computes a target rotational speed of the travel motors 9L and 9R by multiplying the commanded rotational speed provided by the signal from the travel speed input unit 42 by the limit coefficient K. By this process, when the speed coefficient is smaller than 1, the target rotational speed is limited to a value smaller than the commanded rotational speed. In step S6 that follows step S5, the control unit 10 drives the left and right travel motors 9L and 9R via the left and right travel motor drivers 32 and 33, respectively, according to the target rotational speed. At this time, the control unit 10 performs a feedback control based on the signals of the left and right running motor rotational angle sensors 35 and 36, and drives the travel motors 9L and 9R at a predetermined rotational speed. As a result, the electric lawn mower 1 travels at the target travel speed.

Figure 5:
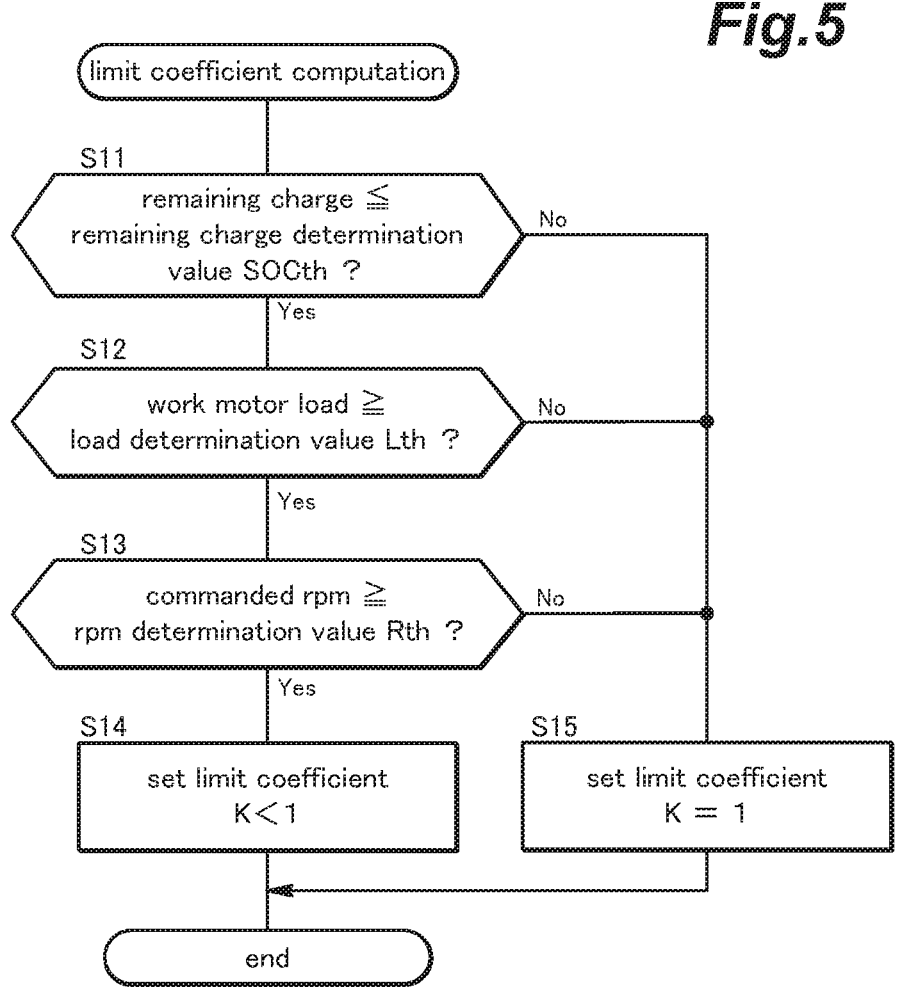
FIG. 5 is a flowchart showing a control process for computing a limit coefficient performed by the control unit.

In the limit coefficient computation shown in FIG. 5, the control unit 10 first determines in step S11 if the remaining charge of the battery is equal to or less than a predetermined remaining charge determination value SOCth. The remaining charge determination value SOCth may be predetermined as a low state of the battery, and, for example, may be 10 to 20% of a fully charged state. If the determination result in step S11 is No, the control unit 10 sets the limit coefficient K to 1 (one) in step S15.

When the determination result in step S11 is Yes, the control unit 10 determines in step S12 if the load of the work motor 8 is equal to or greater than a predetermined load determination value Lth. The load determination value Lth is a predetermined value that indicated a heavy load on the work motor 8. The load of the work motor 8 may be determined based on the current of the work motor 8 detected by the load detection unit 41. If the determination result in step S12 is No, the control unit 10 sets the limit coefficient K to 1 (one) in step S15.

When the determination result in step S12 is Yes, the control unit 10 determines in step S13 if the commanded rotational speed of the travel motors 9L and 9R is equal to or greater than a predetermined rotational speed determination value Rth. The rotational speed determination value Rth is a value defined within a speed range that can be set with the travel speed input unit 42. When the determination result at step S13 is No, the control unit 10 sets the limit coefficient K to 1 in step S15. When the determination result in step S13 is No, the control unit 10 sets the limit coefficient K to a predetermined value smaller than 1 in step S14.

Referring to FIGS. 4 and 5, the mode of operation of the electric lawn mower 1 is discussed in the following. In the electric lawn mower 1, when the user turns on the work lever 16, the work motor 8 is driven and the blade 3A starts rotating, so that lawn mowing can be performed. In the electric lawn mower 1, when the user turns on the work lever 16 and turns on the travel lever 15, the travel motors 9L and 9R start driving the rear wheels 5 so that the electric lawn mower 1 can travel forward. When the electric lawn mower 1 travels forward, the blade 3A necessarily rotates.

The rotational speed of the travel motors 9L and 9R (and hence the travel speed of the electric lawn mower 1) is determined by the commanded rotational speed of the travel motors 9L and 9R designated by the operator's input and the limit coefficient K set in dependence on the state of the electric lawn mower 1.

As shown in FIG. 5, the limit coefficient K is determined according to the remaining charge of the battery, the load on the work motor 8, and the commanded rotational speed of the travel motors 9L and 9R. When the remaining charge of the battery is low (lower than the remaining charge determination value SOCth), the load of the work motor 8 is heavy (equal to or greater than the load determination value Lth), and the commanded rotational speed of the travel motors 9L and 9R is fast (not less than the rotational speed determination value Rth), the limit coefficient is set to a value smaller than 1 so that the rotational speed of the travel motors 9L and 9R is set lower than the commanded rotational speed.

Conversely, if either the remaining charge of the battery is not low (equal to or higher than the remaining charge determination value SOCth), the load on the work motor 8 is light (lower than the load determination value Lth), or the commanded rotational speed of the travel motors 9L and 9R is low (lower than the rotational speed determination value Rth), the limit coefficient K is set to 1, and the rotational speed of the travel motors 9L and 9R is equal to the commanded rotational speed of the travel motors 9L and 9R.

When the travel speed of the electric lawn mower 1 is decreased, the amount of the grass that is cut by the blade 3A per unit time decreases, so that the load of the work motor 8 decreases. When the load on the work motor 8 decreases, the electric power required to drive the work motor 8 decreases with the result that even when the remaining charge of the battery is low, the work can be continued without stopping the work motor 8. As a result, the operation duration of the electric lawn mower 1 can be extended, and a greater amount of work can be performed for the given original state of charge of the battery.

Furthermore, since the electric power to be supplied to the travel motors 9L and 9R decreases as the travel speed decreases, the electric power available for the work motor 8 increases with the result that the operation duration and the performed amount of work of the electric lawn mower 1 further increases.

Step S12 is a process for canceling the limitation of the rotational speed when the load of the work motor 8 is light (lighter than the load determination value Lth). In the case where the load of the work motor 8 is light, reducing the travel speed results in a very small reduction in the load of the work motor 8. Therefore, when the load of the work motor 8 is light, the rotational speed of the travel motors 9L and 9R is maintained at the commanded rotational speed so that the work that is being performed may be continued without any slow down, and may possibly be finished in as short a time as possible.

Step S13 is a process for canceling the limitation of the travel speed when the commanded rotational speed of the travel motors 9L and 9R is low (lower than the rotational speed determination value Rth). In the case where the commanded rotational speed of the travel motors 9L and 9R is low, further reduction in the travel speed results in a very small reduction in the load of the work motor 8. Therefore, when the commanded rotational speed of the travel motors 9L and 9R is low, the rotational speed of the travel motors 9L and 9R is maintained at the commanded rotational speed so that the work that is being performed may be continued without any slow down, and may possibly be finished in as short a time as possible.

The processing of steps S12 and/or S13 is optional for the present invention, and may be omitted if desired.

The control unit 10 may set the limit coefficient K as a value which changes in dependence on the remaining charge of the battery in step S14, instead of as a fixed value. Specifically, the control unit 10 may progressively reduce the limit coefficient K with a decrease in the remaining charge of the battery. For instance, the control unit 10 may reduce the limit coefficient K linearly with a decrease in the remaining charge of the battery.

As a modification of the above embodiment, the control unit 10 may subtract a prescribed correction value from the commanded rotational speed of the travel motors 9L and 9R in steps S14 and S15, instead of multiplying the limit coefficient K to the commanded rotational speed. In this case, the control unit 10 may set a positive correction value in advance in step S14, and set zero for the correction value in step S15. Then, in step S5, the control unit 10 computes the target rotational speed by subtracting the correction value from the commanded rotational speed of the travel motors 9L and 9R.

As another modification of the above embodiment, a rotational speed upper limit value for the target rotational speed of the travel motors 9L and 9R may be set in steps S14 and S15, instead of the limit coefficient K. More specifically, the control unit 10 may set the upper limit value to a first value in advance in step S14, and set the rotational speed upper limit value to a second value in step S15. The first value is lower than the second value, and is a value within the rotational speed range that can be set from the travel speed input unit 42. The second value may be set to the maximum speed that can be set from the travel speed input unit 42. In step S5, the control unit 10 compares the rotational speed upper limit value with the commanded rotational speed of the travel motors 9L and 9R, and sets the target rotational speed to the smaller of the rotational speed upper limit value and the commanded rotational speed.

As yet another modification of the above embodiment, in step S11, the determination process may be performed based on the battery voltage instead of the remaining charge of the battery. In step S11, the control unit 10 determines if the battery voltage is equal to or less than a predetermined voltage determination value Eth. The voltage determination value Eth is selected as a value indicating that the battery is low.

Although the present invention has been described in terms of a preferred embodiment thereof, it is obvious to a person skilled in the art that various alterations and modifications are possible without departing from the scope of the present invention. For instance, the electric lawn mower 1 was provided with a pair of rear wheels 5 that are individually driven by the right and left travel motors 9R and 9L, but may also be provided with a single travel motor for driving both of the rear wheels 5.

Also, the present invention can be applied not only to lawn mowers but also to grass trimmers, snow blowers, tillers and other kinds of electric power equipment fitted with a power propulsion device. In the case of a snow blower, the work unit may include an auger for snow removal. In the case of a tiller, the work unit may comprise a rotary tiller blade.

The invention claimed is:

1. Electric power equipment, comprising:
   a work unit for performing prescribed work;
   a work motor for driving the work unit;
   a travel unit for enabling the electric power equipment to travel on a ground surface; a travel motor for driving the travel unit;
   a battery for supplying electric power to the work motor and the travel motor;
   a control unit for controlling electric power supplied to the work motor and the travel motor; and
   a battery condition detecting unit for detecting a voltage or a remaining charge of the battery;
   wherein the control unit is configured to lower a rotational speed of the travel motor according to a decrease in the voltage or the remaining charge of the battery while a rotational speed of the work motor is maintained at a predetermined rotational speed.

2. The electric power equipment according to claim 1, further comprising an operation input unit for accepting a commanded rotational speed of the travel motor from a user, wherein the control unit is configured to set a target speed of the travel motor to the commanded rotational speed when the voltage or the remaining charge of the battery is above a prescribed level, and set the target speed to a value lower than the commanded rotational speed when the voltage or the remaining charge of the battery is below the prescribed level.

3. The electric power equipment according to claim 1, further comprising a work motor load detection unit for detecting a load acting on the work motor, wherein the control unit is configured to lower the rotational speed of the travel motor when the voltage or the remaining charge of the battery is below a prescribed level, and the load acting on the work motor is greater than a prescribed load determination value.

4. The electric power equipment according to claim 1, further comprising an operation input unit for accepting a commanded rotational speed of the travel motor from a user, wherein the control unit is configured to lower the rotational speed of the travel motor when the voltage or the remaining charge of the battery is below a prescribed level, and the commanded rotational speed is higher than a prescribed rotational speed determination value.

5. The electric power equipment according to claim 1, further comprising an operation input unit for accepting a commanded rotational speed of the travel motor from a user, and a work motor load detection unit for detecting a load acting on the work motor, wherein the control unit is configured to lower the rotational speed of the travel motor when the voltage or the remaining charge of the battery is below a prescribed level, the load acting on the work motor is greater than a prescribed load determination value, and the commanded rotational speed is higher than a prescribed rotational speed determination value.

6. The electric power equipment according to claim 1, wherein the control unit is configured to limit the rotational speed of the travel motor to a level equal to or lower than a prescribed rotational speed upper limit value when the voltage or the remaining charge of the battery is below a prescribed level.

* * * * *